United States Patent

[11] 3,630,134

[72] Inventor Shigeya Nakamura
 Yokohama-Shi, Japan
[21] Appl. No. 766,354
[22] Filed Aug. 20, 1968
[45] Patented Dec. 28, 1971
[73] Assignee Nippon Kogaku K.K.
 Tokyo, Japan
[32] Priority Aug. 28, 1967
[33] Japan
[31] 42/73223

[54] DEVICE FOR INDICATING EXPOSURE FACTORS IN THE VIEWFINDER OF A SINGLE LENS REFLEX CAMERA
4 Claims, 10 Drawing Figs.

[52] U.S. Cl. .................................................. 95/42,
 88/1.5, 350/111
[51] Int. Cl. .................................................. G03b 19/12
[50] Field of Search ....................................... 95/42, 11
 V; 88/15; 350/111

[56] References Cited
 UNITED STATES PATENTS
2,454,280 11/1948 Hardesty ..................... 350/111

3,174,416 3/1965 Heerklotz ..................... 95/44
3,385,190 5/1968 Sho et al. ..................... 95/42

FOREIGN PATENTS
31,150 5/1964 Germany ..................... 95/11
381,079 10/1964 Switzerland ................. 95/11
374,280 2/1964 Switzerland ................. 95/11

Primary Examiner—Samuel S. Matthews
Assistant Examiner—Richard L. Moses
Attorney—Anton J. Wille ABSTRACT: An arrangement is provided for a single lens reflex camera for indicating exposure factors in the viewfinder of the camera. The focusing screen of the camera is provided with a ledge or step portion along one side and a member for indicating the exposure factor is movable along the step portion by a thin cable or thread. The thread is moved by a pulley and reel arrangement driven by the exposure-factor-setting mechanism of the camera. Illumination of the exposure indicia is provided by the viewing mirror, and may also be provided by an auxiliary reflecting member for reflecting the light rays coming directly from the center of the exit pupil of the objective lens.

PATENTED DEC 28 1971 3,630,134
SHEET 1 OF 3
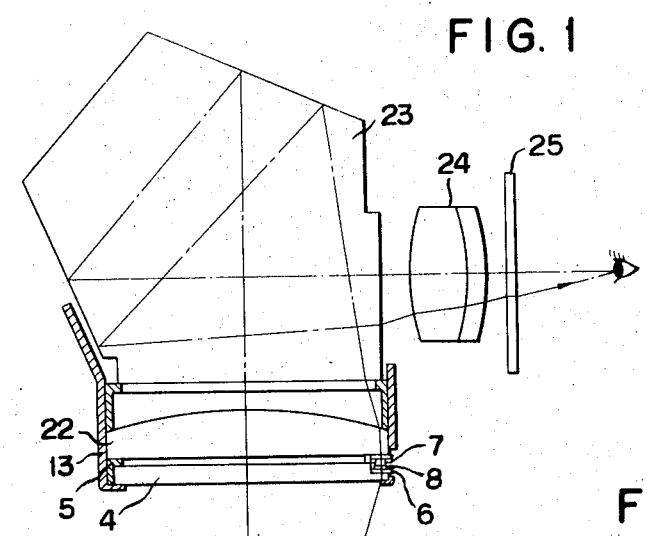
FIG. 1
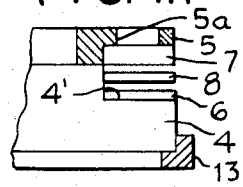
FIG. 1A
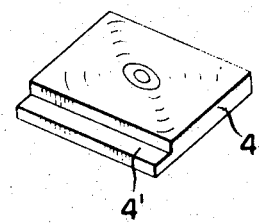
FIG. 3
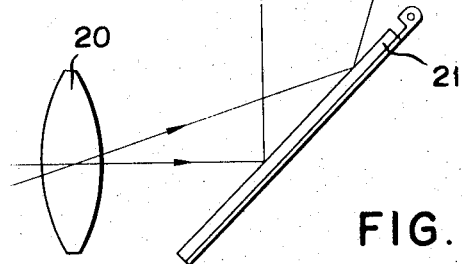
FIG. 2
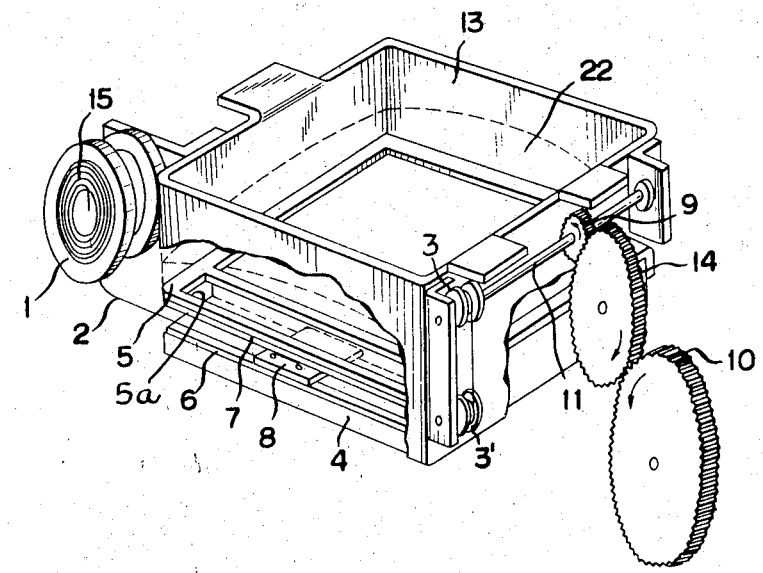

3,630,134

DEVICE FOR INDICATING EXPOSURE FACTORS IN THE VIEWFINDER OF A SINGLE LENS REFLEX CAMERA

This invention relates to viewfinders for single lens reflex cameras, and in particular, to an arrangement whereby exposure factors, such as shutter speed, may be observed in the viewfinder of such cameras.

There have been many proposals in the past for projecting exposure indicia images onto the focusing screen of a single lens reflex camera for observation by the photographer in setting up the scene to be photographed. The images of such indicia were projected to appear within the scene observed, or in frames along the sides of the focusing screen. With these conventional methods, the indicia images sometimes overlapped the viewfinder making it difficult to determine which exposure factor was being observed and the direction in which a setting knob or ring was to be turned to increase or decrease the particular value observed. The conventional arrangements made use of separate lens systems and small prisms to direct the indicia images into the viewfinder eyepiece, often provided only a dimly lighted image or one which was difficult to read because of the size or crowding of the indicia.

The object of this invention is to provide an arrangement for the viewfinder of a single lens reflex camera whereby the images of exposure factors such as shutter speed, are projected onto a side of the focusing screen separate from the observed scene and in clear, legible form.

In accordance with this invention, the focusing screen of a single lens reflex camera is formed with a ledge or step portion along one side. An indicia-indicating member is movable along the step portion by a thread driven by a spool and reel assembly which is geared to an exposure-factor-setting mechanism of the camera, such as the shutter-speed-setting mechanism. The light rays reflected by the viewing mirror illuminate the indicia. The indicia-indicating member may comprise a member of rotatable polarizing characteristics movable between two polarizing plates with their axes of polarization angularly disposed relative to each other, one of the plates being provided with the exposure indicia. The indicating member may also be of a suitable nonflexible material bearing the indicia, the indicia being movable relative to an aperture or window.

To provide a greater degree of illumination for the exposure indicia, an auxiliary reflecting member may be provided for reflecting the light rays coming directly through the center of the exit pupil of the objective lens.

This invention will be described more clearly referring to the illustrative embodiments shown in the attached drawings, in which:

FIG. 1 is a vertical cross-sectional view of the first embodiment of this invention;

FIG. 1A is an enlarged view of a portion of FIG. 1 showing details of the focusing screen, frame and polarizing screens;

FIG. 2 is a perspective view of FIG. 1 with the pentaprism and the condenser lens removed;

FIG. 3 is a perspective view of the focusing screen of FIG. 1;

Figure 4:
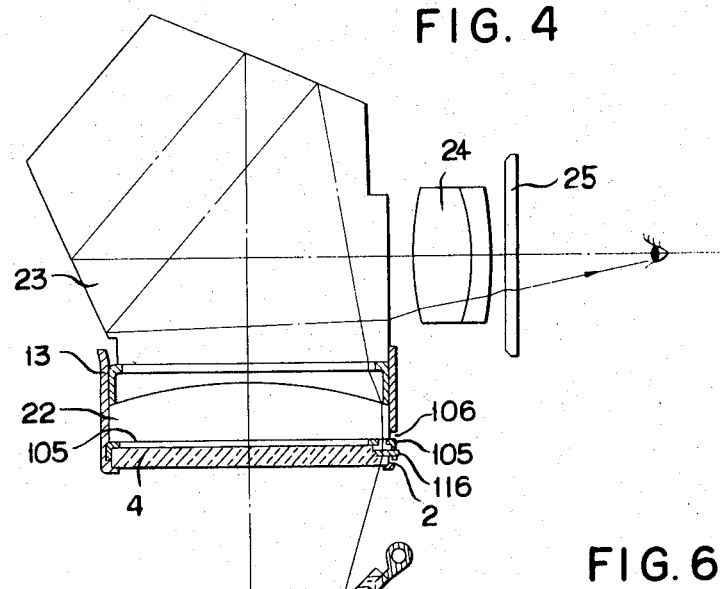
FIG. 4 is the vertical cross-sectional side view of the second embodiment of this invention.

Referring now in detail to FIGS. 1, 2 and 3 illustrating the first embodiment of the present invention, only those elements of a single lens reflex camera viewfinder are illustrated which are essential for an understanding of the invention. A camera objective lens 20 is illustrated in conjunction with a viewing mirror 21 for reflecting the image rays onto a focusing screen 4 supported in a prism box 13. Also supported in the prism box 13 is a condenser lens 22 and a penta prism 23; an ocular lens element 24 and cover plate 25 completing the viewfinder arrangement for the camera. With particular reference to FIG. 3, the focusing screen 4 is formed with a ledge or step portion 4' along one of its sides.

A frame 5 is provided within the prism box 13 forming a washer for positioning and retaining the focusing screen 4 and the condenser lens 22 within the prism box. The frame 5 is formed with an elongated opening 5a which is disposed in spaced relation with respect to the ledge 4' of the focusing screen when the elements are assembled as illustrated.

Disposed on the focusing screen ledge 4' and on the underside of frame 5 aligned with the elongated aperture 5a of the frame are polarizing plates 6 and 7, respectively, the axes of polarization of the two plates being angularly disposed preferably at right angles, relative to each other. Either one of the polarizing plates is provided with exposure value indicia, such as shutter speeds, not otherwise illustrated. Slidably mounted in the space between the two polarizing plates 6 and 7 is a member 8 of birefringent or rotatable polarizing characteristics. The member 8 may be relatively narrow and is secured to a thin wire or thread 2 which is secured at one end to a barrel 1 rotatable mounted on the prism box 13, the barrel 1 being provided with a spring 15 tending to rotate the barrel clockwise and moving the member 8 from right to left in FIG. 2. The other end of the thread 2 passes over a pulley 3' and is secured to a reel 3. The reel 3 is secured to a shaft 11 which is rotatable through gears 9, 14 and 10 by the shutter speed adjusting mechanism (not shown) of the camera.

In FIG. 1, the path of an image ray is illustrated as it passes through the objective lens 20 and is reflected by the viewing mirror 21 to the side of the focusing screen 4, the light ray passing through the polarizing screens and reflected by the pentaprism 23 into the eyepiece 24. With the polarizing axes of the two plates angularly disposed, or preferably at right angles, the rays of light directed to the side of the focusing screen will be partially or entirely blocked except for that portion of the screen side where the member 8 is positioned. The setting of the shutter speed for the camera will rotate the gear 10 to move the member 8 to a corresponding position between the polarizing plates. The member 8 thus provides a lighted area in which the exposure setting provided on either one of the polarizing plates is visible in the viewfinder, the exposure setting being entirely separate and either alongside of, or at the top or bottom of the scene observed, depending on the particular location of the focusing screen ledge and polarizing plates. If the member 8 is made narrow, the narrow lighted strip will form an index mark for the exposure indicia.

Should the member 8 be made of a material such as cellulose xanthogenate, sold under the trademark "Cellophane," this material is very light in weight and the member 8 could be secured to the thread 2 by using the thread for sewing the member to the thread. Spring 15 for barrel 1 will maintain the thread 2 taut at all times so that the member 8 may be moved freely in the space between the two polarizing plates.

In this embodiment, two polarizing plates are provided close to each other, but appropriate changes can be made in accordance with the technical idea of this invention, for example, by providing the upper polarizing plate 7 at the eye piece portion so as to work as the eyepiece filter.

Figure 6:
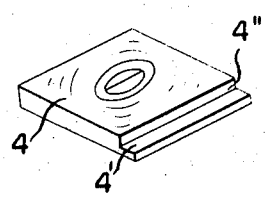
FIG. 6 is a perspective view of the focusing screen of FIG. 4.
Figure 5:
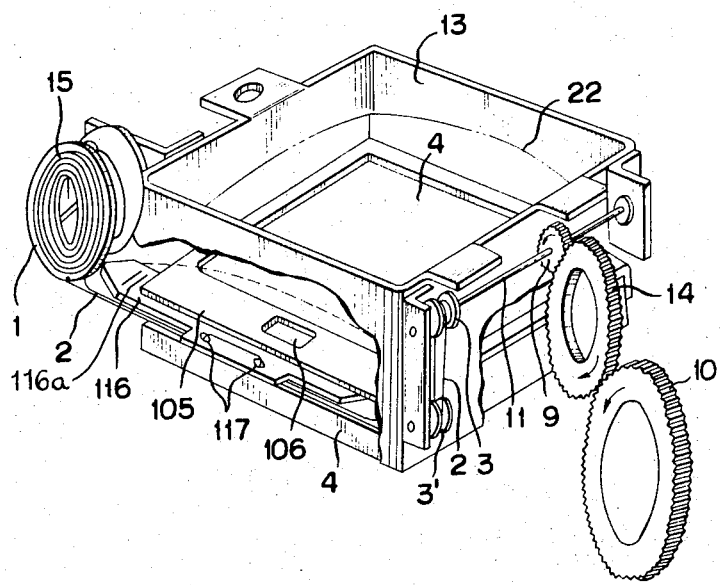
FIG. 5 is a perspective view of FIG. 4 with the penta prism and the condenser lens removed.

Referring now to FIGS. 4 through 6 of the drawings wherein a second embodiment of the invention is illustrated, the same reference numerals are used to designate the same or similar elements illustrated in FIGS. 1 through 3. In this embodiment, a frame 105 is provided with a window or aperture 106 which is centrally disposed with respect to the ledge or step 4' (FIG. 6) formed on the focusing screen 4. In this embodiment an elongated member 116 of relatively stiff or nonflexible material such as that sold under the trademark "Mylar" and having a shutter speed setting scale 116a thereon, is provided for longitudinal movement by the thread 2 upon setting of the shutter speed. The thread is threaded through two spaced openings 117 in the member thereby providing an adjustment for positioning the member so that the shutter speed value is indicated in the window 106.

The setting of the shutter speed mechanism will rotate the gear 10 to move the member 116 in the same manner as hereinbefore described in connection with the first embodiment, the spring 15 keeping the thread 2 taut so that counterclockwise rotation of the gear 10 moves the member 116 to the right and the clockwise rotation of the gear 10 moves the member 116 to the right and clockwise rotation of the gear will permit the spring 15 to move the member to the left in FIG. 5. The shutter speed setting is then visible through the window 106 in frame 105 either as light (transparent) indicia against a black background, or as black indicia against a light background. Should the shutter speed setting be at either of the extremes of shutter speeds, i.e. at B or at 1/1000, the nonflexible material of the member will not permit rolling up of the member on barrel 1 or spool 3'. The member 116 may also be of metal with the necessary indicia punched through the metal plate.

It will be noted in FIG. 6, that the focusing screen 4 if formed with a vertical surface or riser 4'' which can serve as a guide rail for the member 116.

When the indicia is light against a black background, it will be readily observed by the photographer even though the particular numeral or letter does not appear directly in the center of the window 106. By overlapping the thread 2, it is possible to compensate for the widths of the indicia such as B, 1, ½,-1/1000 when the 1/1000 indicia is at the roller 3' end. Further, the window 106 may be made more or less wider to accommodate the indicia. It is quite difficult to compensate for varying intervals between adjacent indicia by overlapping of the thread.

Figure 7:
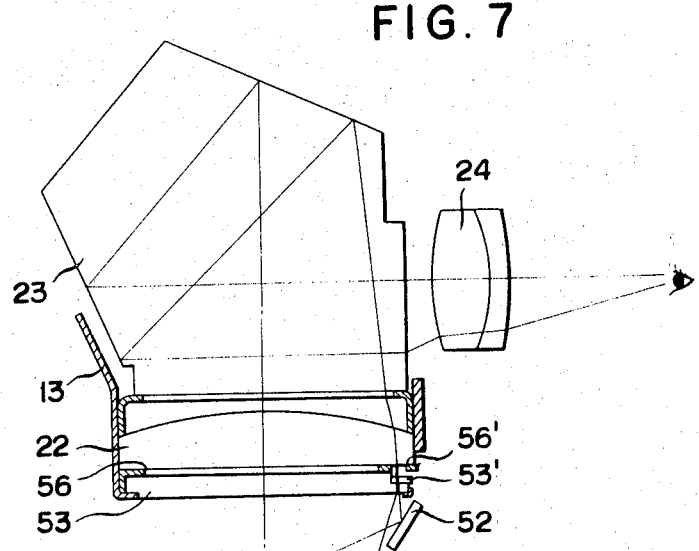
FIG. 7 is the vertical cross-sectional side view of the third embodiment of this invention.
Figure 9:
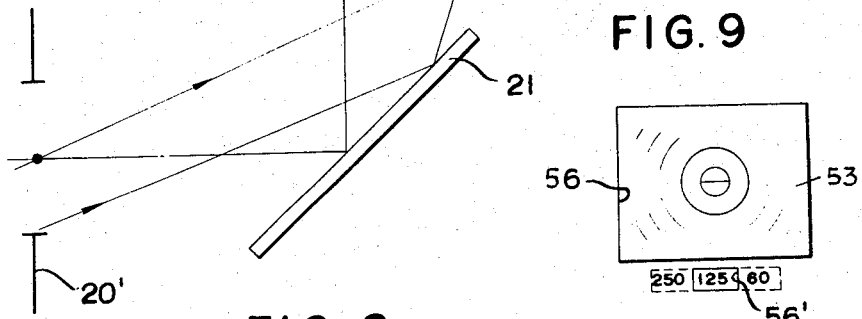
FIG. 9 is a plan view of the indicator scale frame and the finder view frame of FIG. 7.
Figure 8:
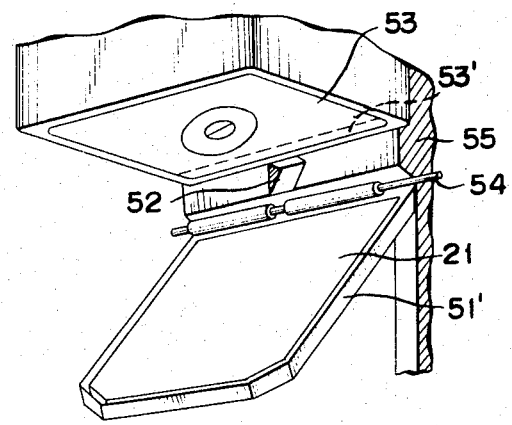
FIG. 8 is a perspective view showing the under surface of the focusing screen and the reflecting mirror of FIG. 7.

Referring to FIGS. 7 through 9, another embodiment of the invention is illustrated in which an auxiliary reflecting member 52 is secured on a boss 55 provided on the camera body and forming the support for a shaft 54 on which the reflecting mirror support frame 51 is pivoted. A focusing screen 53 supported in the prism box 13 is provided at one end with exposure indicia 53', the focusing screen being held in position by a frame 56. The frame 56 is formed with a scale frame or window 56' which is in alignment with the indicia 53' on the focusing screen. The construction of the prism box, frame and screen, and the indicia moving mechanism is similar to the embodiment illustrated in FIG. 5.

In FIG. 7 two light paths are illustrated as they leave the exit pupil 20' of the objective lens. One of the light rays is reflected by the viewing mirror 21 to the scale end 53' of the focusing screen. It will be readily apparent that this light ray could be blocked or partially blocked when the aperture of the objective is stopped down. The second light ray is illustrated as emerging from a center portion of the exit pupil 20' at the optical axis of the objective and is reflected only by the auxiliary reflecting member 52 into the scale end of the focusing screen 53. The second light ray will not be effected by any focusing of the objective or stopping down of the lens aperture so that the scale 53° is always brightly illuminated.

By providing the auxiliary reflecting member 52 at an appropriate position and of suitable length, any light reflected by the viewing mirror 21 toward the scale end of the focusing screen has very little, if any, effect upon the degree of illumination provided by the auxiliary reflecting member.

The auxiliary reflecting member 52 need not have the planar-reflecting surface illustrated. The reflecting surface could be curved depending on the positions of the objective exit pupil and the scale end of the focusing screen. The inclination of the reflecting surface of the reflecting member is also determined by these factors. The curvature of the reflecting surface, or the inclination of a planar-reflecting surface is determined so that light rays from one point on the objective axis at the exit pupil will be reflected to illuminate the center of the indicia indicating the particular shutter speed setting.

When the lower surface of the indicator scale 53' is diffusion surface such as mat glass, the radius of curvature of auxiliary reflecting member 52 can be selected such that the image of a point on the exit pupil can be formed on the diffusion surface, and when it is made into transparent surface, the radius of curvature can be advantageously selected in such a manner that the image of the exit pupil can be formed at the position of the eyes.

In the case of a camera provided with interchangeable lenses wherein the exit pupils are not always in the same relative position when such lenses are mounted on the camera, it is possible to effect the same efficiency by changing the inclination of the auxiliary reflecting member 52 in accordance with the particular lens.

The inclination of the reflecting surface of the auxiliary member is not necessarily set at 45° with the optical axis of the objective. By changing the form of a conventional die-cast camera body slightly, it is possible to select the required inclination of the reflecting surface in accordance with the position of the objective exit pupil. It is thus possible to remove any interference or interruption of the light rays due to the stopping down or focusing of the lens so that the indicia is always brightly illuminated.

What is claimed is:

1. A single lens reflex camera having means for adjusting the values of at least one exposure factor, the combination comprising:
   a viewfinder for observing an object to be photographed through the camera lens, the finder comprising
   a focusing screen having a step portion at one edge thereof,
   a frame having an aperture for the field view, the frame overlapping the screen,
   a reflecting member for directing the light passing through the camera lens to the screen,
   a window formed in the frame in a position overlapping a plane substantially parallel to the screen surface and within the reflecting light path of the reflecting member,
   an elongated marker member having indicia for indicating the value of the exposure factor and having a projection at a central portion thereof, the member being slidable along the step portion of the screen within a space defined by the frame and said parallel plane.
   a driving means for moving the indicia member forwardly and reversely, the driving means comprising a thread extending along the step portion and connected to said projection of the indicia member,
   at least one reel for taking up the thread,
   an operating member for rotating the reel forwardly and reversely, the operating member being controlled by the operation of adjusting means for the values of exposure factor,
   a biasing means for biasing the indicia member in the direction opposite to the direction of take up of the thread by the reel, and
   an auxiliary reflector arranged at a position outside the finder light path between the reflecting member and the screen and having a reflecting surface inclined to direct the light rays passing through the camera lens at substantially the central portion of the exit pupil.

2. A single lens reflex camera according to claim 1, in which at least one surface of the step portion is formed as a guide surface for the indicia member.

3. A single lens reflex camera according to claim 1, in which the indicia member has a plurality of small openings in the projection formed thereon in alignment with its direction of movement, the thread passing through said small holes to secure the member to said thread.

4. A single lens reflex camera having a viewfinder including an eyepiece, a focusing screen and a viewing mirror for reflecting the light rays passing through the camera lens onto the focusing screen to be viewed through the eyepiece and having means for adjusting the value of at least one exposure factor, the combination comprising
   a pair of spaced polarizing plates having their respective axes angularly disposed relative to each other, said pair of plates being in the path of light rays reflected by the viewing mirror,
   exposure indicia provided on one of said plates.

a member of rotatable polarizing characteristics movable in a path between said polarizing plates, and means for positioning said member by said adjusting means to provide illuminated indicia of the exposure factor value set by the adjusting means, the focusing screen being formed with a step portion along one side thereof, at least one of said polarizing plates overlaying said step portion, said one plate being provided with said exposure indicia, and said member being movable between said polarizing plates along the path determined by said one plate, the means for positioning said member includes a spring biased barrel and a reel disposed on opposite sides of the focusing screen and adjacent to the step portion formed thereon, a thread secured at its ends to said barrel and said reel, said member being secured to said thread, and a gear arrangement for rotating said reel by the adjusting means for moving said member by said thread;

a frame having an aperture for the field of view, the frame overlapping the focusing screen and further formed with an elongated window above the step portion in the focusing screen and said polarizing plates, the indicia provided on one of said plates being viewable through said window, and an auxiliary reflector provided at a position outside the light path between the viewing mirror and the screen, the auxiliary reflector having a reflecting surface inclined to direct the light rays passing through the camera lens substantially from the central portion of the exit pupil of the camera lens to the window.

* * * * *